US 8,705,366 B2

(12) United States Patent
Mekkattuparamban et al.

(10) Patent No.: US 8,705,366 B2
(45) Date of Patent: Apr. 22, 2014

(54) DYNAMIC LOAD BALANCING WITHOUT PACKET REORDERING

(75) Inventors: Joji Thomas Mekkattuparamban, Sunnyvale, CA (US); Narender Enduri, Cupertino, CA (US); Udayakumar Srinivasan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 13/355,968

(22) Filed: Jan. 23, 2012

(65) Prior Publication Data

US 2013/0188494 A1    Jul. 25, 2013

(51) Int. Cl.
*H04L 12/26*    (2006.01)

(52) U.S. Cl.
USPC ...................................... 370/235.1

(58) Field of Classification Search
USPC ........... 370/229–235.1, 351–356, 389–395.1, 370/395.5–395.52, 412–413, 428–429, 370/473–474
See application file for complete search history.

(56) References Cited

U.S. PATENT DOCUMENTS

| | | | |
|---|---|---|---|
| 6,765,867 B2 | 7/2004 | Shanley et al. | |
| 6,829,245 B1 | 12/2004 | Medina et al. | |
| 7,020,713 B1 * | 3/2006 | Shah et al. | 709/235 |
| 7,161,904 B2 * | 1/2007 | Hussain et al. | 370/230 |
| 7,359,318 B2 * | 4/2008 | Abel et al. | 370/229 |
| 7,529,242 B1 * | 5/2009 | Lyle | 370/392 |
| 7,782,885 B1 | 8/2010 | Sabato et al. | |
| 7,787,379 B2 | 8/2010 | Mekkattuparamban et al. | |
| 7,792,131 B1 | 9/2010 | Ma et al. | |
| 7,924,828 B2 * | 4/2011 | Hass et al. | 370/389 |
| 2006/0221974 A1 | 10/2006 | Hilla et al. | |
| 2007/0014240 A1 | 1/2007 | Kumar et al. | |
| 2007/0171929 A1 | 7/2007 | Kim et al. | |
| 2007/0223482 A1 | 9/2007 | Wyatt | |
| 2008/0123671 A1 | 5/2008 | Spencer | |
| 2009/0252035 A1 | 10/2009 | Kukunaga et al. | |
| 2010/0290473 A1 | 11/2010 | Enduri et al. | |

FOREIGN PATENT DOCUMENTS

WO    0205494 A1    1/2002
WO    03075520    9/2003

OTHER PUBLICATIONS

International Search Report and Written Opinion in counterpart International Application No. PCT/US2012/070756, mailed May 3, 2013.

* cited by examiner

*Primary Examiner* — Frank Duong
(74) *Attorney, Agent, or Firm* — Edell, Shapiro & Finnan, LLC (57) ABSTRACT

Flows of packets are dynamically mapped to resource queues. Flows of packets are received at a network device to be routed from the network device in a network. Each flow comprises packets to be sent from a source to a connection. Data is stored for a queue allocation table that maintains a plurality of buckets to which received packets for a flow are assigned and indicating which of a plurality of resource queues are allocated for respective buckets. For each packet in a flow, a hash function is computed from values in a header of the packet and the packet is assigned to one of the plurality of buckets based on the computed hash function. One of a plurality of resource queues is allocated for each bucket to which packets are assigned based on the computed hash function.

24 Claims, 9 Drawing Sheets

```
struct qat_entry_t_ {
            uint32 qid;
            uint32 load;
            uint32 aging;
} qat_entry_t;
```

DYNAMIC LOAD BALANCING WITHOUT PACKET REORDERING

TECHNICAL FIELD

The present disclosure relates packet queuing for delivery to resources, such as a member of a port channel, port, link, thread or core.

BACKGROUND

Capacity scaling in network equipment involves distributing network traffic across multiple paths or resources (e.g., network links, switch ports, switching fabric, processing cores, or threads, etc.). Preserving packet order puts a constraint on the manner of traffic distribution, often resulting in uneven load distribution and sub-optimal utilization of links or other resources. With the increasing usage of aggregated links such as port-channels and multi-core central processing units, there is room for improving traffic distribution and in particular to provide for dynamic traffic distribution.

DESCRIPTION OF EXAMPLE EMBODIMENTS

Overview

Flows of packets are dynamically mapped to resource queues. Flows of packets are received at a network device to be routed from the network device in a network. Each flow comprises packets to be sent from a source to a connection. Data is stored for a queue allocation table that maintains a plurality of buckets to which received packets for a flow are assigned and indicating which of a plurality of resource queues are allocated for respective buckets. For each packet in a flow, a hash function is computed from values in a header of the packet and the packet is assigned to one of the plurality of buckets based on the computed hash function. One of a plurality of resource queues is allocated for each bucket to which packets are assigned based on the computed hash function.

Example Embodiments

Figure 1:
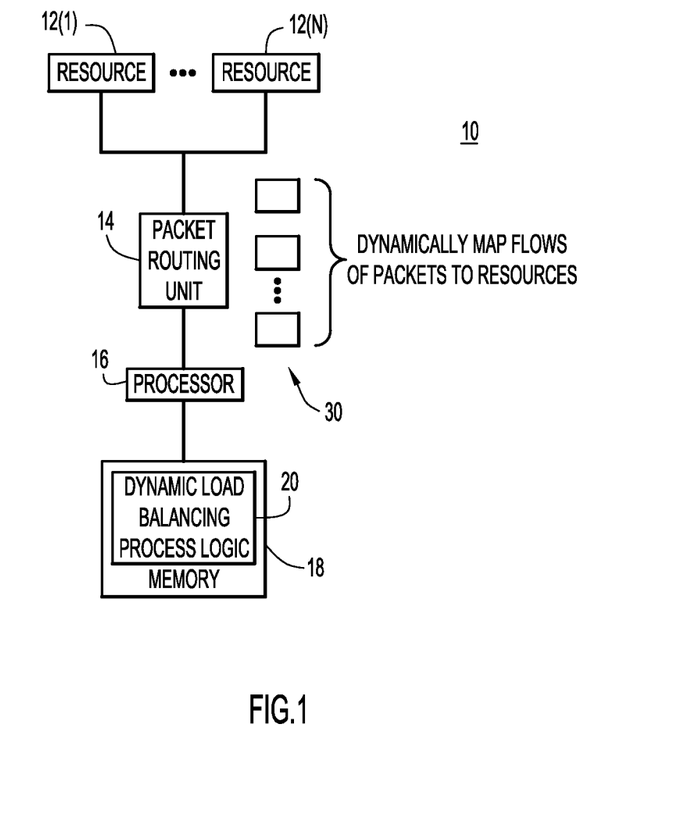
FIG. 1 is a block diagram of a network device, e.g., a router or switch, configured to dynamically map flows of packets to resources.

Referring first to FIG. 1, a block diagram of an example network device 10 is shown. The network device 10, as described herein, is configured to perform dynamic load balancing for flows of packets without losing order of the packets. The network device 10 may be an aggregation switch, data center switch, edge switch, and router (integrated service, carrier service, etc.). The network device 10 has multiple resources 12(1)-12(N) that are used for packet forwarding or processing purposes. Examples of the resources 12(1)-12(N) are ports, members of a port-channel, links, core of a multiple-core central processing unit (CPU), processing threads, etc. Packets may be received at the network device 10 via any of the resources 12(1)-12(N) and then routed from the network device 10 from any of the resources 12(1)-12(N).

The network device 10 further comprises a packet routing unit 14. The packet routing unit 14 may be embodied by one or more fixed or programmable application specific integrated circuits (ASICs) that are built with (fixed or programmable) digital logic (e.g., hardware or firmware) to perform packet routing and relating packet processing operations with respect to ingress and egress packet flows. There is a processor 16 that is coupled to the packet routing unit 14. The processor 16 is a programmable processing device, e.g., a microprocessor or microcontroller, that serves as a controller for the network device 10. The processor 16 is coupled to memory 18. The memory 18 is used for storing working data and instructions executed by the processor 16. To this end, the memory may store instructions for dynamic load balancing process logic 20.

The memory 18 may comprise read only memory (ROM), random access memory (RAM), magnetic disk storage media devices, optical storage media devices, flash memory devices, electrical, optical, or other physical/tangible memory storage devices. Thus, in general, the memory 18 may comprise one or more tangible (non-transitory) computer readable storage media (e.g., a memory device) encoded with software comprising computer executable instructions and when the software is executed (by the processor 16) it is operable to perform the operations described herein in connection with dynamic load balancing process logic 20. When the processor executes the dynamic load balancing process logic 20, it performs the operations described herein. As an alternative, the packet routing unit 14 may be configured with the appropriate digital logic to perform the operations of the dynamic load balancing process logic 20 described herein. FIG. 1 shows a flow 30 of packets that the network device 10, through operations of the packet routing unit 14 or processor 16, dynamically maps to the resources 12(1)-12(N).

Current packet queuing techniques employ a static hashing scheme for classification and distribution of packets to different queues. This scheme has a drawback in that it cannot distribute packets based on load.

The dynamic load balancing packet queuing techniques described herein achieve dynamic load distribution without causing packet reorder and without being overly complex. These techniques are useful for load distribution of packet forwarding threads, but may also be used for any network packet distribution feature or function, such as a port-channel.

Figure 2:
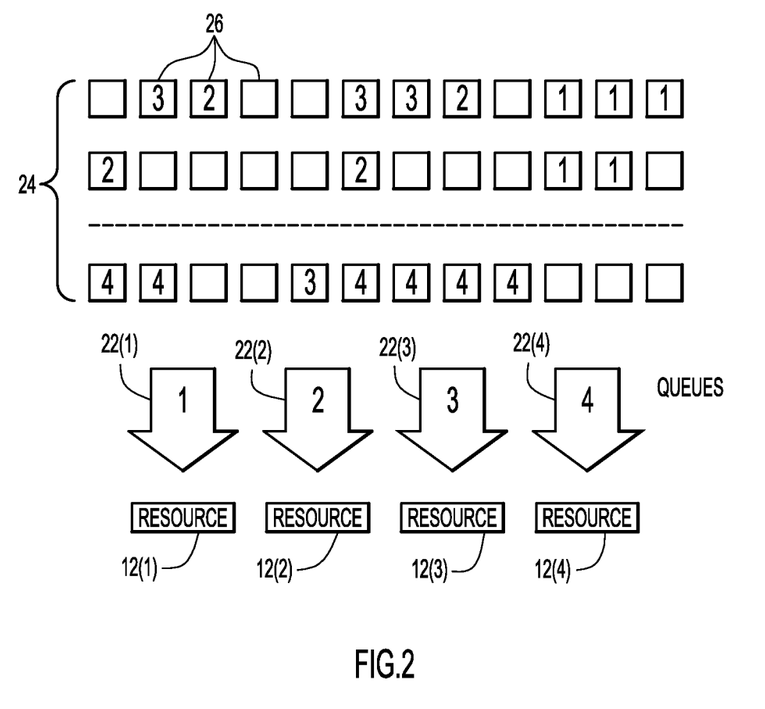
FIG. 2 is a diagram pictorially depicting the techniques described herein for dynamically mapping flows of packets to resource queues.

Reference is now made to FIG. 2, the operations of the dynamic load balancing process is generally described. FIG. 2 pictorially depicts a plurality of resource queues, each associated with a corresponding one of the resources 12(1)-12(N). In the example of FIG. 2, N=4, for resources 12(1)-12(4). Thus, the resource queues are shown at reference numerals 22(1)-22(4). The resource queues are essentially buffers or memory locations that store pointers to packets. The packets themselves may be stored in a separate area of memory from the resource queues. As part of the dynamic load distribution/balancing techniques described herein, a dynamically mapping table is created for allocation of resource queues instead of a static hash. The mapping table is referred to herein as a queue allocation table (QAT) and is shown at reference numeral 24. The QAT 24 and the plurality of resource queues are embodied by memory locations in memory 18.

The QAT 24 maintains a plurality of "buckets" (memory locations) shown at reference numeral 26 to which received packets for a flow are assigned. When a packet flow is assigned to a bucket, one of the resource queues is allocated to that bucket and the QAT 24 also stores data indicating which of the plurality of resource queues, e.g., resource queues 22(1)-22(4) are allocated to it. Packets of a flow are assigned to a particular bucket based on a hash function. That is, for each packet in a flow, a hash function is computed from values in a header of the packet, and the packet is assigned to one of the plurality of buckets based on the computed hash function. For example, the hash function is computed from the 4-tuple information (source address, destination address, checksum, etc.) in the header of the packet.

When a flow of packets is assigned to a bucket, a resource queue is allocated for that bucket. More than one bucket (and thus more than one flow of packets) may be assigned to a particular resource queue. For example, FIG. 2 shows that five different buckets labeled with the number "1" (and thus five different packet flows) are assigned to resource queue 22(1) for resource 12(1). Similarly, four different buckets labeled with the number "2" (and thus four different packet flows) are assigned to resource queue 22(2) for resource 12(2). Four buckets labeled with the number "3" (and thus four different packet flows) are assigned to resource queue 22(3), and six buckets labeled with the number "4" (and thus six different packet flows) are assigned to resource queue 22(4). The buckets shown in FIG. 2 which are not labeled are buckets that have not been allocated to a flow.

Figure 3:
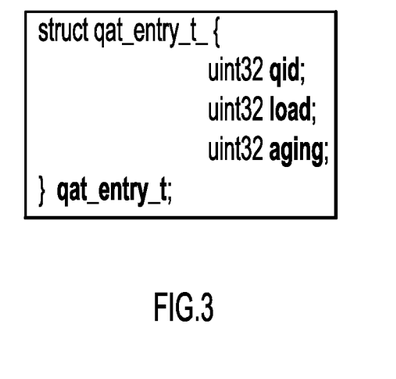
FIG. 3 is a diagram illustrating an example entry in a queue allocation table used for dynamically mapping flows of packets to resource queues.

Reference is now made to FIG. 3. FIG. 3 shows an example of a data structure for an entry in the QAT 24. Initially, all buckets are set to queue identifier (qid)=INVALID_QUE_ID and a load counter (Lcount)=0. When a packet arrives, its hash bucket (which of the plurality of buckets to which the packet for a flow is assigned) is determined based on the packet header fields (e.g., 4-tuple, such as Transport Control Protocol [TCP] 4-tuple). If the bucket has a valid queue entry (that is, that bucket is already assigned to a particular queue), the packet is directed to that queue and the load is incremented. If the bucket does not have a valid queue entry, then a queue is allocated and the bucket's entry is updated with that qid. Thus, each entry in the QAT 24 includes a 32 bit integer (uint32) field for qid, load, and aging.

Reference is now made to FIGS. 4-8 for a description of several flow charts that depict the operations performed in a network device through execution of the dynamic load balancing process logic 20 and other capabilities of the network device. Reference is also made to FIG. 2 for the description of these figures.

Figure 4:
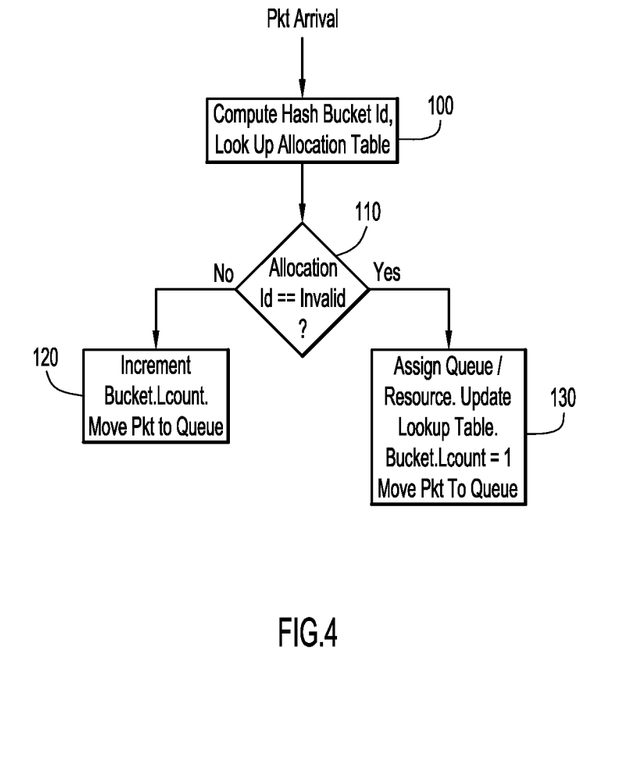
FIG. 4 is a flow chart depicting operations to assign packets in a flow to buckets.

FIG. 4 illustrates a flow chart for operations performed upon arrival/receipt of a packet. At 100, a hash bucket identifier (ID) is computed for the packet based on the information in the header of the packet, e.g., a TCP 4-tuple, in order to determine which bucket to allocate the packet to, e.g., one of the plurality of buckets 26 shown in FIG. 2. At 110, the qid of that bucket (resulting from the hash computation at 100) is evaluated to determine whether it is INVALID, i.e., whether it is a bucket that has already been assigned to a resource queue or is an unallocated bucket—not currently assigned to a resource queue. A bucket with a qid=INVALID is a bucket that is not currently assigned to a resource queue.

If at 110 it is determined that the qid for that bucket is not INVALID, then at 120, the load counter Bucket.Lcount is incremented, and the packet is moved to that bucket. In other words, that bucket is already in use and packets for a flow have already been allocated to that bucket. The current packet is another packet for a flow that has been allocated to that bucket.

If at 110 it is determined that the qid for that bucket is INVALID, then at 130, that bucket is assigned to a resource queue (based on a round robin selection referred to above and described in more detail hereinafter). Also, the QAT is updated to reflect the assignment of that bucket to a resource queue, the load counter Bucket.Lcount for that bucket is set to 1, and the packet is moved to that bucket.

Figure 5:
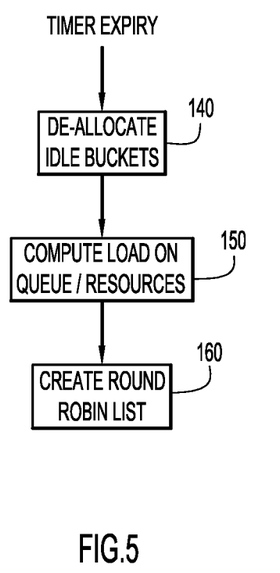
FIG. 5 is a flow chart depicting operations performed on a periodic basis in the course of dynamically mapping flows of packets to resource queues.

FIG. 5 shows operations performed on a regular/periodic basis, e.g., upon expiration of a timer. At 140, operations are performed to de-allocate idle buckets. The details of the bucket de-allocation process 140 are described in connection with FIG. 6. At 150, operations are performed to compute the load on resource queues. At 160, operations are performed to create/update the round robin list for selecting a resource queue for a bucket. The round robin list creation/update process is described hereinafter in connection with FIG. 7.

Figure 6:
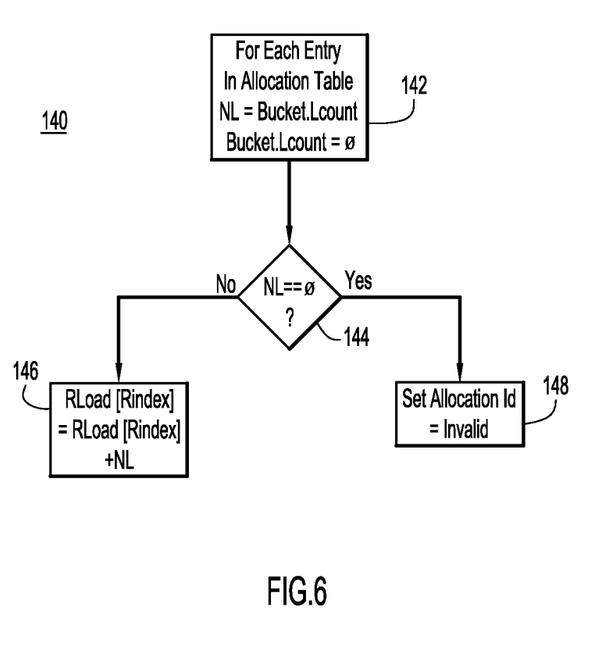
FIG. 6 is a flow chart depicting operations for a background polling routine to de-allocate buckets that are not in use.

Turning to FIG. 6, the bucket de-allocation process 140 is now described. This flow chart is for the background timer handler invoked to determine the load on each bucket for the last interval. At 142, for each entry in the QAT, the load value for the current interval (NL) is read (NL=Bucket.Lcount value) for that bucket. After reading the load value, Bucket.Lcount is reset to zero so it can accumulate the count for the next interval. At 144, it is determined whether NL is equal to zero. When it is determined that NL is not equal to zero, then at 146, a resource queue specific load measure quantity RLoad[Rindex] is updated with the value of NL, RLoad[Rindex]=RLoad[Rindex]+NL, where Rindex is a index value corresponding to a particular resource queue. For example, Rindex=1 refers to Resource Queue 1, and so on. When it is determined that NL is equal to zero, then at 148, the qid value is set to INVALID for that bucket. Thus, FIG. 6 depicts a background polling routine that detects that there was no load on a bucket for a predetermined period of time, e.g., two consecutive polling periods (or some other sufficient period of time). When this occurs, the corresponding entry for that bucket is removed from the QAT. This allows a most eligible queue to be selected the next time there is traffic in this bucket. Also, when the traffic has stopped on a flow bucket, it is safe to move that flow/bucket to a different queue.

The operations for the resource load/allocation update process 150 and round robin list creation/update process 160 are described with reference to FIG. 7. The resource load/allocation update process 150 involves determining queue allocation based on available capacity of each queue. A periodic background polling routine computes the available capacity of each queue based on the total load on the queue in the previous interval. Based on the capacity, a round robin list of qid's is created. The list has multiple entries for each queue, with the number of entries proportional to the current capacity of that queue. Once this list is set up by the polling routine, the next entry from this round robin list is selected.

Figure 7:
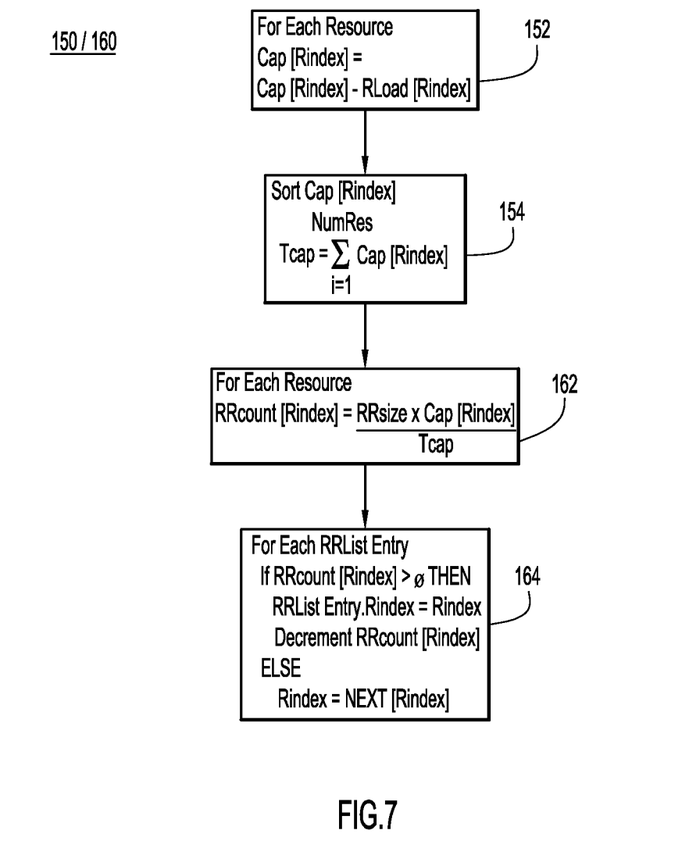
FIG. 7 is a flow chart depicting operations for determining capacity of each of the resource queues and to create/update a round robin list used for selecting a resource queue.

Specifically, with reference to FIG. 7, at 152, the capacity of a resource queue, denoted Cap[Rindex], is computed from the load for that resource queue RLoad(Rindex), according to the computation Cap[Rindex]=Cap[Rindex]−RLoad(Rindex). The operation 152 is performed for all resource queues, i.e., Rindex=1 to number of resource queues (NumRes). At 154, the capacities of the resource queues are sorted (greatest to lowest), and a total capacity of all of the resource queues is computed, Tcap=sum of capacity of all of the resource queues, Rindex=1 to NumRes.

At 162, a round robin count (RRcount) for each resource queue, RRcount[Rindex], is computed from the size of the round robin list (RRsize), the capacity of that resource queue, Cap[Rindex], and the total capacity of the resource queues, Tcap, according to the computation {RRsize×Cap[Rindex]}/Tcap.

Next, at 164, for each entry in the round robin list, RRentry, the following operations are performed. If RRcount[Rindex] is greater than zero, then the RRList entry for that resource queue, Rindex, is set equal to Rindex, and RRcount[Rindex] is decremented. If RRcount(Rindex) is equal to zero, then Rindex is set equal to the next resource queue in the list, Next[Rindex].

In summary, the round robin list, RRList, can be considered as a simple array. The contents of the array identify the resource queue that will be assigned to the bucket. The array is indexed by an integer that increments after each allocation and wraps around, thereby achieving a round robin nature for resource queue allocation. This approach allows selection of the best resource queue for a newly created packet flow. Once a queue has been selected for a given packet flow, it is preferable to maintain that allocation for the life of that flow. A scheme for dynamically moving flows, if the traffic load so dictates, is also described below.

The techniques described herein so far work well as long as the flows are relatively short-lived (e.g., less than 30 seconds) which is the case most of the time. These techniques will perform better than static hashing because they are not completely reliant on the effectiveness of the hashing function.

However, it is possible that a flow stays persistent and causes disruption to the load distribution. In this case, it may be necessary to move some buckets to a different resource queue. This bucket moving mechanism is triggered if the percentage capacity consumed by the one or more buckets marked as persistent (based on how long they stay active), exceeds a preset threshold (for example, 65%).

Ensuring order consistency requires that packets already in the pipeline have been processed before the queue reassignment is applied. In the case of packet forwarding threads, this involves finishing switching of packets already in the queue.

In the case of a port channel link, this involves transmitting out the packets already in queue and waiting for a fixed delay, corresponding to the transit time of the packets. Until this processing delay expires, the new packets belonging to the bucket being reassigned are held in a hold queue. At the delay expiration, the hold queue is assigned to the correct resource queue (link or thread) and the queue is processed normally.

This scheme uses some additional queues (virtual links) to be created in order to allow the persistent thick flows to be moved. For use cases such as the packet forwarding threads, this is easy to implement. For a port channel implementation, support from the transmit driver may be involved.

Thus, one way to handle persistent thick flows is to create one or more "hold" queues (temporary queues), allocate a different resource queue for the bucket whose load exceeds a predetermined threshold for a predetermined period of time, direct packets in the bucket to one of the hold queues for a delay time period, and upon expiry of the delay time period, the packets in the hold queue are directed to a different resource queue than the resource queue previously allocated for the bucket.

The dynamic allocation scheme relies on hashing to bundle/assign the flows into a manageable number of buckets. The hashing scheme can be manipulated to ensure that well-known "thick" flows are not placed in the same bucket or buckets, which would overload a particular bucket. Examples of so-called thick flows are those that have a large persistent volume of traffic and which are sent to ports that are known to be used for such thick flows, such as virtual machine migration (e.g., Vmotion) traffic.

Figure 8:
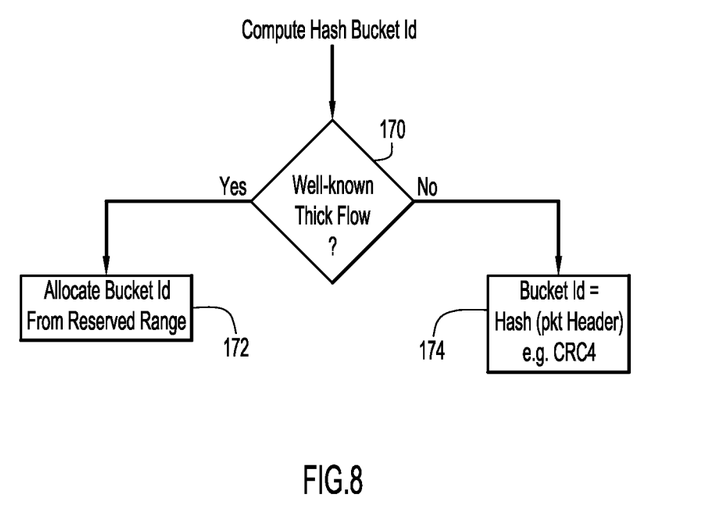
FIG. 8 is a flow chart depicting operations for special handling of well-known thick flows.

FIG. 8 illustrates a flow chart depicting operations useful to handle special processing of well-known thick flows. After the hash computation is made for a packet to determine its bucket identifier (at operation 100 in FIG. 4), at 170, the header of the packet is examined to determine whether the source address, destination address or other parameters in the header of the packet indicate that the packet is associated with a well-known thick flow. If it is determined at 170 that the packet is associated with a well-known thick flow, then at 172, instead of assigning that packet to the bucket resulting from the hash computation, it is allocated a bucket identifier from a reserved range of buckets. Thus, there are a number of buckets that are reserved for use in handling well-known thick flows to avoid assigning them all to the same bucket(s). On the other hand, if it is determined at 170 that the packet is not associated with a well-known thick flow, then at 174, the packet is assigned to the bucket based on the hash computation, e.g., Bucket ID=Hash(packet header).

In summary, the process of FIG. 8 involves determining, based on destinations of packets, whether packets in the flows are associated with relatively high bandwidth flows, and assigning packets of relatively high bandwidth flows to one or more reserved buckets so that no more than a predetermined number of relatively high bandwidth flows are assigned to the same bucket.

Figure 9:
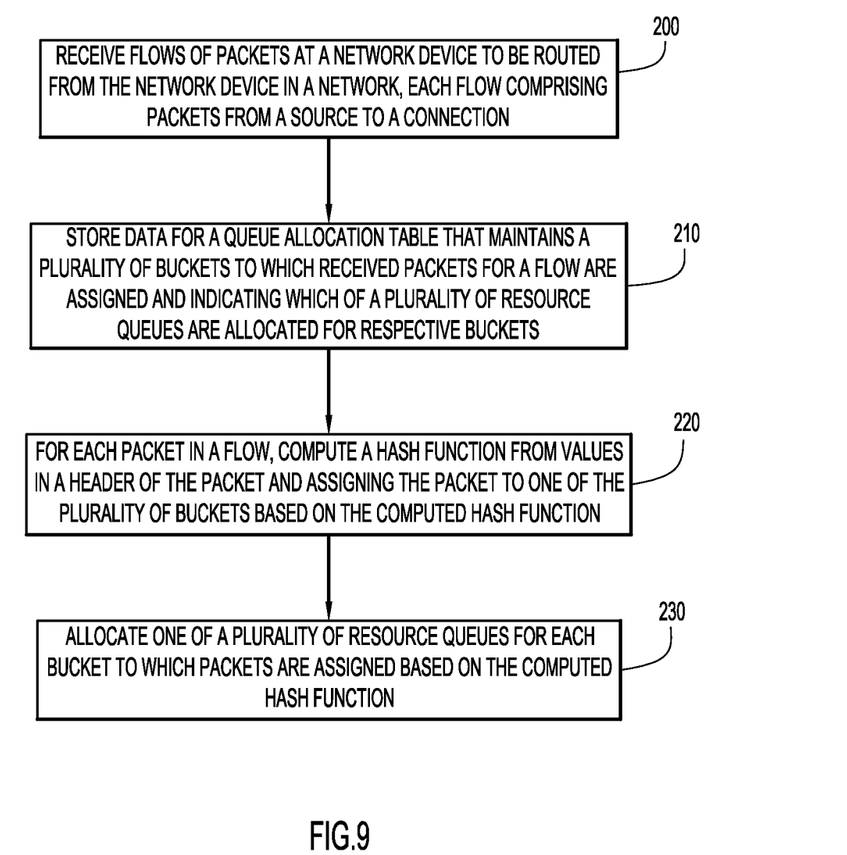
FIG. 9 is a flow chart depicting the overall operations for dynamically mapping flows of packets to resource queues.

FIG. 9 is a flow chart that depicts the overall operational flow of the dynamic mapping techniques described herein. At 200, flows of packets are received at a network device to be routed from the network device in a network. Each flow comprises packets to be sent from a source to a connection. At 210, data is stored for a queue allocation table that maintains a plurality of buckets to which received packets for a flow are assigned and indicating which of a plurality of resource queues are allocated for respective buckets. At 220, for each packet in a flow, a hash function is computed from values in a header of the packet and the packet is assigned to one of the plurality of buckets based on the computed hash function. At 230, one of a plurality of resource queues is allocated for each bucket to which packets are assigned based on the computed hash function. Thus, in order to perform the operation at 230, data is stored in a memory of the network device for the plurality of resource queues.

As explained above, the queue allocation table also stores, for each bucket to which packets are assigned, a queue identifier that identifies the resource queue allocated for that bucket. Furthermore, it is determined whether a bucket that results from the computed hash function for a packet is already assigned to one of the plurality of resource queues, and if so, the packet is assigned to that bucket and a measure of load is incremented for that bucket. When it is determined that a bucket that results from the computed hash function for a packet is a bucket for which a resource queue is not already allocated, a resource queue for that bucket is allocated and an entry in the queue allocation table is updated for that bucket that includes a queue identifier for the resource queue to which the bucket is assigned.

The dynamic mapping schemes described herein effectively address load balancing of short-lived flows, without adding complexity. Well-known thick flows can be addressed by adding special handling in the hashing scheme. Persistent flows can be addressed by adding some additional complexity. Unlike a static hashing scheme which essentially strives to distribute flows as opposed to load, this dynamic allocation approach allows the actual load to be distributed. By moving the flows only when the bucket is idle, packet order preservation is ensured.

The above description is intended by way of example only.

What is claimed is:

1. A method comprising:
receiving flows of packets at a network device to be routed from the network device in a network, each flow comprising packets to be sent from a source to a connection;
storing data for a queue allocation table that maintains a plurality of buckets to which received packets for a flow are assigned and indicating which of a plurality of resource queues are allocated for respective buckets;
for each packet in a flow, computing a hash function from values in a header of the packet and assigning the packet to one of the plurality of buckets based on the computed hash function;
determining a capacity of each of the plurality of resource queues; and
allocating, based on the determined capacities of the plurality of resource queues one of the plurality of resource queues for each bucket to which packets are assigned based on the computed hash function.

2. The method of claim 1, wherein storing data for the queue allocation table further comprises storing for each bucket to which packets are assigned a queue identifier that identifies the resource queue allocated for that bucket.

3. The method of claim 2, and further comprising determining whether a bucket that results from the computed hash function for a packet is already assigned to one of the plurality of resource queues, and if so, assigning the packet to that bucket and incrementing the measure of load for that bucket, and when it is determined that a bucket that results from the computed hash function for a packet is a bucket for which a resource queue is not already allocated, further comprising allocating a resource queue for that bucket and updating an entry in the queue allocation table for that bucket that includes a queue identifier for the resource queue to which the bucket is assigned.

4. The method of claim 1, wherein allocating comprises allocating a new bucket to a resource queue from a round robin list of the resource queues in order of relative capacity of the respective resource queues.

5. The method of claim 1, wherein determining the capacity is performed on a periodic basis.

6. The method of claim 1, and further comprising determining load on the plurality of buckets on a periodic basis, and wherein storing data for the queue allocation table comprises storing a measure of load on each of the plurality of buckets.

7. The method of claim 6, and further comprising deleting an entry for a bucket from the queue allocation table when it is determined to have no load for at least a predetermined period of time so that the bucket can be moved to a different resource queue when packets are subsequently assigned to it.

8. The method of claim 6, and further comprising determining when load on a bucket is higher than a predetermined threshold for a predetermined period of time.

9. The method of claim 8, and further comprising creating one or more hold queues, allocating a different resource queue for the bucket whose load exceeds the predetermined threshold for the predetermined period of time, directing packets in the bucket to one of the hold queues for a delay time period, and upon expiry of the delay time period, directing the packets in the hold queue to a different resource queue than the resource queue previously allocated for the bucket.

10. The method of claim 1, and further comprising determining, based on destinations of the packets, whether packets in the flows are associated with relatively high bandwidth flows, and assigning packets of relatively high bandwidth flows to one or more reserved buckets so that no more than a predetermined number of relatively high bandwidth flows are assigned to the same bucket.

11. The method of claim 1, wherein each of the plurality of resource queues is associated with a member of a port channel.

12. The method of claim 1, wherein each of the plurality of resource queues is associated with a core among a plurality of processing cores.

13. The method of claim 1, wherein each of the plurality of resource queues is associated with a link among a plurality of links in a network.

14. One or more computer readable storage media encoded with software comprising computer executable instructions and when the software is executed operable to:
receive flows of packets at a network device to be routed from the network device in a network, each flow comprising packets from a source to a connection;
store data for a queue allocation table that maintains a plurality of buckets to which received packets for a flow are assigned and indicating which of a plurality of resource queues are allocated for respective buckets;
for each packet in a flow, compute a hash function from values in a header of the packet and assign the packet to one of the plurality of buckets based on the computed hash function;
determine a capacity of each of the plurality of resource queues; and
allocate, based on the determined capacities of the plurality of resource queues, one of the plurality of resource queues for each bucket to which packets are assigned based on the computed hash function.

15. The computer readable storage media of claim 14, wherein the instructions operable to store comprise instructions operable to store for each bucket to which packets are assigned a queue identifier that identifies the resource queue allocated for that bucket.

16. The computer readable storage media of claim 14, wherein the instructions operable to allocate comprise instructions operable to allocate a new bucket to a resource queue from a round robin list of the resource queues in order of relative capacity of the respective resource queues.

17. The computer readable storage media of claim 14, and further comprising instructions operable to determine load on the plurality of buckets on a periodic basis, and wherein the instructions operable to store comprise instructions operable to store a measure of load on each of the plurality of buckets.

18. The computer readable storage media of claim 14, and further comprising instructions operable to determine, based on destinations of the packets, whether packets in the flows are associated with relatively high bandwidth flows, and to assign packets of relatively high bandwidth flows to one or more reserved buckets so that no more than a predetermined number of relatively high bandwidth flows are assigned to the same bucket.

19. An apparatus comprising:
a network interface unit configured to enable communications over a network;
a memory;
a processor coupled to the network interface unit and the memory, wherein the processor is configured to:

receive flows of packets to be routed in the network, each flow comprising packets from a source to a connection;

store data in the memory for a queue allocation table that maintains a plurality of buckets to which received packets for a flow are assigned and indicating which of a plurality of resource queues are allocated for respective buckets;

for each packet in a flow, compute a hash function from values in a header of the packet and assign the packet to one of the plurality of buckets based on the computed hash function;

store data for a plurality of resource queues;

determine a capacity of each of the plurality of resource queues; and allocate, based on the determined capacities of the plurality of resource queues, one of the plurality of resource queues for each bucket to which packets are assigned based on the computed hash function.

20. The apparatus of claim 19, wherein the processor is further configured to determine load on the plurality of buckets on a periodic basis, and to store a measure of load on each of the plurality of buckets in the queue allocation table.

21. The apparatus of claim 20, wherein the processor is further configured to delete an entry for a bucket from the queue allocation table when it is determined to have no load for at least a predetermined period of time so that the bucket can be moved to a different resource queue when packets are subsequently assigned to it.

22. The apparatus of claim 21, wherein the processor is further configured to determine when load on a bucket is higher than a predetermined threshold for a predetermined period of time.

23. The apparatus of claim 22, wherein the processor is further configured to generate one or more hold queues, allocate a different resource queue for the bucket whose load exceeds the predetermined threshold for the predetermined period of time, direct packets in the bucket to one of the hold queues for a delay time period, and upon expiry of the delay time period, direct the packets in the hold queue to a different resource queue than the resource queue previously allocated for the bucket.

24. The apparatus of claim 19, wherein the processor is further configured to determine, based on destinations of the packets, whether packets in the flows are associated with relatively high bandwidth flows, and assign packets of relatively high bandwidth flows to one or more reserved buckets so that no more than a predetermined number of relatively high bandwidth flows are assigned to the same bucket.

* * * * *